United States Patent [19]

Rigbi

[11] 4,101,301
[45] Jul. 18, 1978

[54] FORMATION OF SPHERES OF THERMOPLASTIC MATERIALS, ESPECIALLY GLASS

[75] Inventor: Zvi Rigbi, Haifa, Israel

[73] Assignee: Technion Research and Development Foundation, Ltd., Haifa, Israel

[21] Appl. No.: 736,532

[22] Filed: Oct. 28, 1976

[30] Foreign Application Priority Data

Oct. 28, 1975 [GB] United Kingdom ............... 44456/75

[51] Int. Cl.² ............................................. C03B 19/10
[52] U.S. Cl. .......................................... 65/21; 65/142; 264/3 E; 425/10
[58] Field of Search .................. 65/21, 142; 264/3 C, 264/3 E, 14, 15; 425/10, 6

[56] References Cited

U.S. PATENT DOCUMENTS

| | | | |
|---|---|---|---|
| 2,952,868 | 9/1960 | Rowan | 264/15 |
| 3,353,940 | 11/1967 | Dolf | 65/21 |
| 3,997,310 | 12/1976 | Cone | 65/142 X |

Primary Examiner—Robert L. Lindsay, Jr.
Attorney, Agent, or Firm—Browdy and Neimark

[57] ABSTRACT

A method and apparatus for manufacturing spheres from molten material, such as glass, by allowing drops of the molten material to pass from one end to another of a column containing a liquid, such as a mixture of salts, the temperature of the column being so graduated that the drops harden during passage through the column. The column can be bifurcated at the lower end into legs provided with cooling cuffs for alternate use.

10 Claims, 2 Drawing Figures

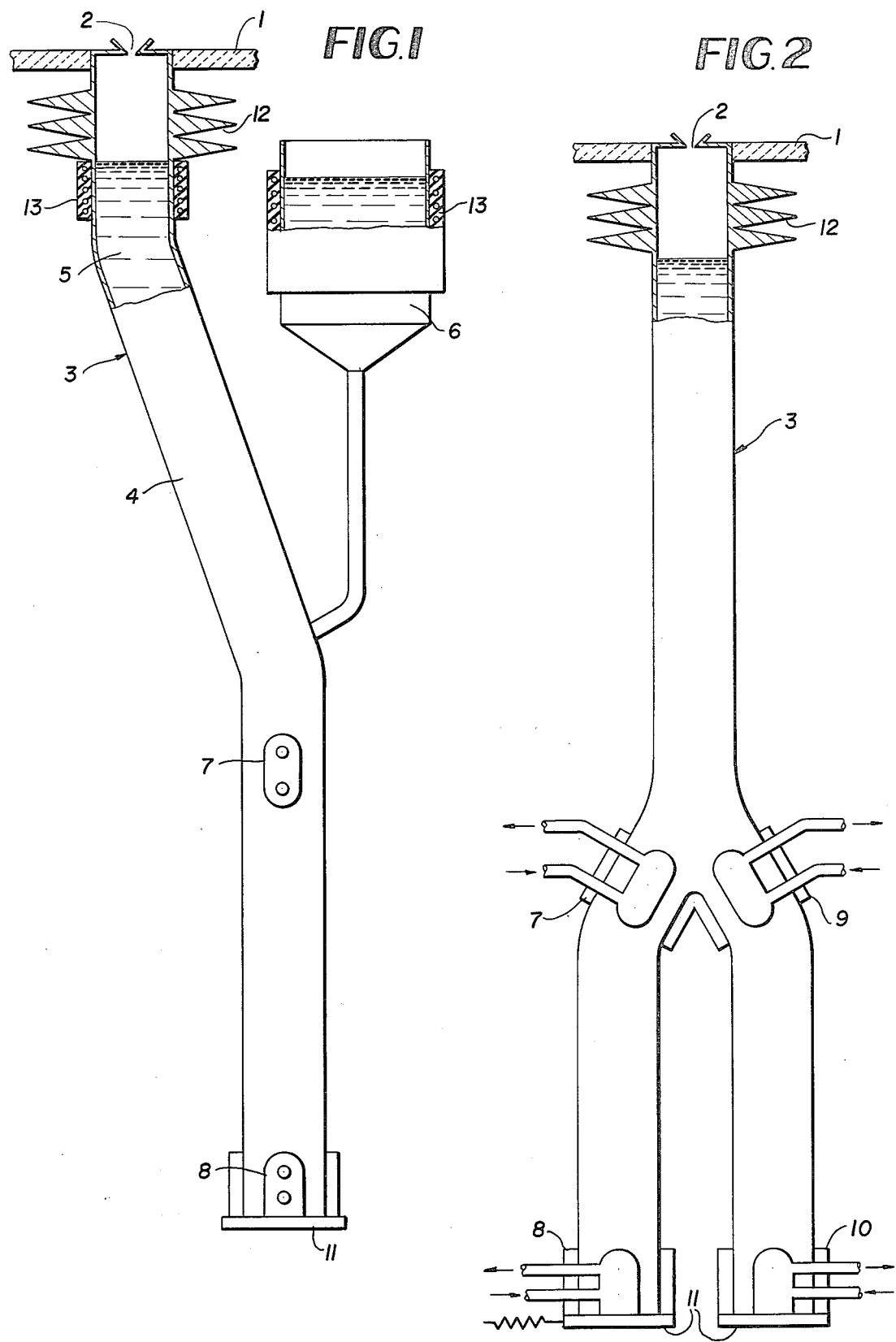

FORMATION OF SPHERES OF THERMOPLASTIC MATERIALS, ESPECIALLY GLASS

FIELD OF THE INVENTION

The present invention concerns a method of manufacturing spheres from a molten material, and apparatus for carrying out the method. The invention is particularly, though not exclusively, concerned with making glass spheres.

BACKGROUND OF THE INVENTION

It is known that such spheres may be manufactured by a number of casting or molding methods using molds specifically adapted in each case to the material used. Such known methods and the apparatus utilizing them have a number of disadvantages, chief among them being the fact that it is extremely difficult to eliminate the parting line on the final sphere, corresponding to the line on which the two halves of the mold close, and the protuberence left by the so-called sprue or entry port of the molten material. The accuracy of the resulting sphere is determined by the condition and the shape of the mold, which in turn are adversely effected by frequent use, quite apart from the difficulty in initially arriving at a perfect shape. Another method which is used particularly with glass spheres and which may also supplement the previously described method is to grind a large number of rough spheres in a rotating drum together with an abrasive powder. This method produces spheres with matt surfaces which are also relatively inaccurate and exhibit considerable differences between their major and minor diameters.

SUMMARY OF THE INVENTION

Accordingly, in one aspect the present invention consists of a method of manufacturing spheres from molten material in which a drop of the molten material is allowed to sink or to rise through a column filled with a liquid with which said molten material either does not react chemically at all, or does so only to an insignificant extent, the temperature of the column being so graduated that when the drop has passed along the column, it will have hardened sufficiently to be handled.

In another aspect the present invention consists of apparatus for carrying out the above method comprising means for melting the material and arranged to deliver molten drops of the material to one end of a substantially upright tube carrying a liquid material through which the drops can move either by falling under gravity or by floating, means being provided for maintaining a temperature gradient in the liquid material such that the liquid at the end of the tube where the drops are introduced is hotter than the liquid at the other end, the temperature of the liquid at the said other end being below the point at which the molten material hardens.

BRIEF DESCRIPTION OF THE DRAWINGS

An embodiment of the present invention will now be described, by way of example, and with reference to the accompanying drawings, in which:

FIG. 1 is a diagrammatic side view of apparatus for manufacturing glass spheres constructed in accordance with the present invention, and FIG. 2 is a diagrammatic front view of the apparatus of FIG. 1.

DESCRIPTION OF THE PREFERRED EMBODIMENTS

The apparatus shown in the accompanying drawings is for use in a process for making spheres from a fusible material such as glass. A typical glass would be of the kind known as "Sovirel MO." Thus, in the drawings, 1 represents the hearth floor of a conventional furnace for melting glass and capable, for example, of heating the molten glass to 1100° C. The molten glass is allowed to drip through a nozzle 2 of suitable heat and chemical resistant material into a sphere-forming column generally indicated at 3 and comprising a tubular body 4 containing a liquid material 5. A constant head of liquid glass is provided in the furnace, and the temperature of the glass and the nozzle diameter are so chosen that the drops of molten glass falling from the nozzle 2 are of the required size.

The liquid material 5 is a salt mixture selected to give a uniform melt at all temperatures down to at least a few degrees below the annealing point of the glass whilst having at this temperature a density slightly less than that of the glass at the same temperature. The precise value of the density difference is not critical and depends to a small extent on the size of the spheres to be produced. Nevertheless the density difference should be of the order of 0.05 to 0.2. The faster the rate of fall of the drops through the liquid salt the greater is the distortion of shape. The rate of fall is governed by the relative densities, but the high viscosity of glass avoids practical difficulties in this matter.

The liquid material 5 is preferably a mixture of salts and one such mixture consists of NaCl, KCl and CsCl. For Sovirel MO glass a mixture of $ZnCl_2$ and NaCl may also be advantageous. The temperature of the salt mixture 5 is adjusted so that the drops of molten glass cool slowly as they fall through the mixture, allowing the drops to assume nearly perfect sphericity. In the present example the temperature of the salt mixture at the top of the column 3 is maintained at 750° C, and it gradually drops to 380° C at the bottom of the column. To counteract the continuous input of heat with the molten glass, cooling fins 12 are provided at the top of the column 3. The annealing temperature of the molten glass is approximately 560° C. The level of melt in the column 3 is maintained roughly constant by being replenished with melt from a continuously heated reservoir 6. Close to its lower end the column 3 is bifurcated so that a substantially continuous throughput of glass spheres can be obtained in a manner to be described.

When the installation is put into operation, the salt mixture 5 in the column 3 is brought up to temperature by suitable external heating means, such as insulated electrical resistance wire wound on the outside 13, while a flow of cooling water is maintained through cooling cuffs indicated at 7, 8, 9 and 10. The effect of these cooling cuffs is to cool the salt mixture adjacent thereto so that plugs of solid salt are obtained. When stable temperatures have been achieved, the cooling water in cuff 9 is turned off, the result of which is that the salt plug adjacent to the cuff 9 is melted. The nozzle 2 is opened and the molten glass drips into the salt mixture 5. The drops descent at a decreasing rate down the column 3 and are deflected by the solid, still cooled plug of salt mixture at the left-hand leg so that the drops pass into the right-hand leg. As this leg fills up with spheres the level of the salt mixture rises in the column 3, the initial level being selected so that the final level is still a few centimeters below the nozzle 2.

The cooling water in cuff 7 is now turned off and that in cuff 9 turned on so that the plug of solid mixture in the upper end of the left-hand leg of the column 3 melts while a solid plug is formed in the upper end of the right-hand leg, thus isolating the hardened spheres which have fallen into the right-hand leg. Furthermore fresh drops entering the column are now deflected into the left-hand leg. The cooling water in the plug 10 is now turned off and a removable sealing plate 11 at the bottom of this leg heated electrically so that the lower plug in this leg melts and the spheres and salt now isolated in this leg can be discharged through a metal mesh into a heated container which is not shown. The spheres are then passed through a lehr and washed free of salt while the discharged salt is returned to the reservoir. This process can be repeated indefinitely so that a substantially continual throughput of spheres is achieved.

Although the column described is vertical, it may alternatively be slightly inclined in whole or in part so as to allow the disposition of a number of columns around closely disposed groups of nozzles in the hearth floor of a single furnace.

All the metal parts of the apparatus described must be of a material which is highly resistant to corrosion. The alloy known as Inconel 600 has been found suitable for this purpose.

What I claim is:

1. A method for manufacturing hardened spheres from molten material, comprising:
    filling a column with a liquid which either does not react chemically at all, or does so only to an insignificant extent, with said molten material and which has a specific density less than that of the material at the temperature in the column, said specific density difference being between 0.05–0.2;
    causing a graduation of temperature of the liquid in the column such that the liquid at the top of the column is hotter than that at the bottom, the temperature at the top of the column being above the temperature at which the material passing through the column is sufficiently hard to be handled without deformation, and the temperature graduation within the column being such that a drop of said molten material passing through said column will have hardened sufficiently to be handled without danger of deformation by the time it reaches the bottom; and
    allowing a drop of said molten material to enter the liquid at the top of the column and to pass through the liquid in the column, from the top to the bottom thereof.

2. A method in accordance with claim 1, wherein the liquid in the column is a mixture of salts.

3. A method in accordance with claim 1 wherein the molten material is glass.

4. An apparatus for manufacturing hardened spheres from molten material, comprising:
    a tube for carrying a liquid, the lower end of said tube being bifurcated into two legs;
    melting means for melting the material;
    nozzle means for delivering drops of said molten material from said melting means to the top of the tube;
    temperature affecting means for maintaining a temperature gradient in the liquid carried by said tube such that the liquid is hotter at the top of the tube than at the bottom and the temperature of the liquid at the bottom of the tube is below the point at which the molten material hardens; and
    directing means for selectively directing hardened spheres falling through said tube into one or the other of said legs.

5. Apparatus in accordance with claim 4, wherein the tube is filled with a mixture of salts.

6. Apparatus in accordance with claim 4, wherein said directing means includes a cooling cuff associated with each of said legs, through which a cooling liquid can circulate to cool a portion of said leg.

7. An apparatus in accordance with claim 6, wherein each of said legs has an outlet opening at the lower end thereof, and further including a movable sealing plate associated with each of said outlet openings and heating and cooling means, associated with each said movable sealing plate, for heating or cooling the liquid in the vicinity of the respective sealing plate.

8. Apparatus in accordance with claim 6, wherein each said cooling cuff is located near the top of the respective one of said bifurcated legs.

9. A method in accordance with claim 2, wherein the lower end of said column is bifurcated into two legs with a cooling cuff mounted near the top of each bifurcated leg, and further including the steps of:
    circulating cooling water through the cooling cuff on a first one of said legs until the said mixture adjacent thereto is cooled sufficiently to obtain a plug of solid salt, whereby the sinking drops of molten material are deflected into the other of said legs; and then
    discontinuing the circulation of cooling water through said one cooling cuff and circulating cooling water through the other of said cooling cuffs until the salt mixture adjacent thereto is cooled sufficiently to attain a plug of solid salt, whereby the sinking drops of molten material are deflected into the first one of said legs.

10. A method in accordance with claim 9, further including the steps of:
    removing the hardened spheres from the bottom of the first one of said legs when cooling water is being circulated through the cooling cuff of said first leg and the sinking drops are being deflected into the other leg; and
    removing the hardened spheres from the bottom of the other one of said legs when cooling water is being circulated through the cooling cuff of said other leg and the sinking drops are being deflected into said first leg.

* * * * *